United States Patent [19]

Ikeda et al.

[11] 4,364,578
[45] Dec. 21, 1982

[54] LATERAL DRAG LINK TYPE STEERING LINKAGE FOR A VEHICLE

[75] Inventors: Hideo Ikeda; Hideo Aizawa, both of Yokohama, Japan

[73] Assignee: Nissan Motor Co., Ltd., Yokohama, Japan

[21] Appl. No.: 190,293

[22] Filed: Sep. 24, 1980

[30] Foreign Application Priority Data

Oct. 1, 1979 [JP] Japan .................................. 54-125420

[51] Int. Cl.³ .............................................. B62D 7/06
[52] U.S. Cl. .................................. 280/95 R; 280/95 A
[58] Field of Search ..................... 280/95 R, 95 A, 233

[56] References Cited

U.S. PATENT DOCUMENTS 3,596,730 8/1971 Cecce .................................. 280/95 R
3,944,247 3/1976 Cook .................................... 280/726

FOREIGN PATENT DOCUMENTS 299663 11/1928 United Kingdom .

*Primary Examiner*—Joseph F. Peters, Jr.
*Assistant Examiner*—John A. Carroll
*Attorney, Agent, or Firm*—Thompson, Birch, Gauthier & Samuels

[57] ABSTRACT

A lateral drag link type steering linkage for an automotive vehicle equipped with a vehicle frame and a pair of front wheels and a pair of rear wheels attached thereto. The linkage includes a relay lever pivotally mounted at one end thereof to the vehicle frame, the relay lever having a connecting portion, a drag link ball joint through which the connecting portion of the relay lever is movably joined to one end of a drag link, and a relay rod one end of which is movably connected to one end of a pitman arm for a steering gear and the other end of which is movably connected to the connecting portion of the relay lever. The drag link ball joint is positioned near the imaginary line between a pair of knuckle ball joints for a pair of knuckle arms.

13 Claims, 6 Drawing Figures

LATERAL DRAG LINK TYPE STEERING LINKAGE FOR A VEHICLE

BACKGROUND OF THE INVENTION

The present invention relates to a lateral drag link type steering linkage for an automotive vehicle equipped with a vehicle frame and a pair of front wheels and a pair of rear wheels attached thereto.

FIGS. 1 and 2 show a prior art lateral drag link type steering linkage. A steering linkage is provided between a pair of front wheels 1 and a steering gear 2 in such a way that a steering force or motion may be transmitted from the steering gear 2 to the front wheels 1 when required. One end of a pitman arm 3 is connected to the steering gear 2 and the other end thereof is connected through a drag link ball joint 4 to one end of a drag link 5. The other end of the drag link 5 is connected through a drag link ball joint 6 to a tie rod 7 near one end thereof. The tie rod 7 is laterally arranged between the front wheels 1 and is connected at its respective ends to a pair of knuckle arms 10, 11 through a pair of knuckle ball joints 8, 9. The knuckle arms 10, 11 are joined to the respective front wheels 1 in a well known manner. The numeral 12 designates a frame of the automotive vehicle.

Such a conventional steering linkage is so arranged that a rigid axle supports a leaf spring suspension. For example, as shown in FIG. 2, a shaft of the steering gear 2 or any shaft corresponding thereto is arranged outside the leaf spring 13 is such a manner that the drag link 5 does not interfere with the leaf spring 13 at the full bounding thereof by setting a drag link ball joint 4 at a high level. Even if the leaf spring 13 moves up to the position shown by a chain line 13' in FIG. 2, it does not contact the drag link 5. The drag link 5 inclines to one side so that one end of the drag link 5 is far from the tie rod 7.

In such an arrangement of the steering linkage, however, the movement locus M of the drag link ball joint 6 around the knuckel ball joint 9 differs greatly from the movement locus N of the same link ball joint 6 around the drag link ball joint 4 during driving as best shown in FIG. 2. Thus, so called "kick back" transferred from the road to the steering wheel is apt to occur. In particular, as a four wheel drive vehicle which often moves on a poor road is equipped with a differential gear at a front portion thereof, a drag link is usually arranged in a lateral direction of the vehicle frame from a viewpoint of the layout of other members. For such a reason, such a phenomenon cannot be avoided in a four wheel drive vehicle.

SUMMARY OF THE INVENTION

According to the present invention, a lateral drag link type steering linkage for an automotive vehicle includes a relay lever pivotally mounted at one end thereof to a vehicle frame, the relay lever having a connecting portion, a drag link ball joint through which the connecting portion of the relay lever is movably joined to one end of a drag link, and a relay rod one end of which is movably connected to one end of a pitman arm for a steering gear and the other end of which is movably connected to the connecting portion of the relay lever. The drag link ball joint is positioned near the imaginary line between a pair of knuckle ball joints for a pair of knuckle arms.

Consequently, an object of the present invention is to eliminate the defects of the prior art as abovestated.

A further object of the present invention is to provide a lateral drag link type steering linkage in which the movement locus of a drag link ball joint around a knuckle ball joint is not greatly different from the movement locus of the same drag link ball joint around another drag link ball joint.

Still a further object of the present invention is to provide a lateral drag link type steering linkage in which so called "kick back" is decreased.

DETAILED DESCRIPTION OF THE PREFERRED EMBODIMENTS

Figure 2:
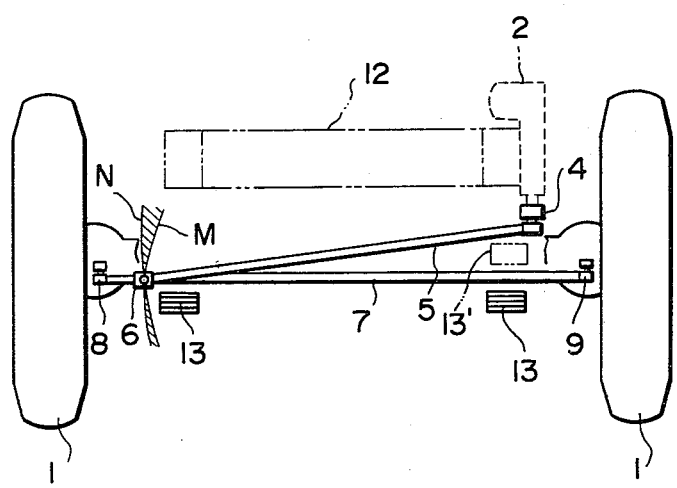
FIG. 2 is a schematic front view of the steering linkage shown in FIG. 1.
Figure 3:
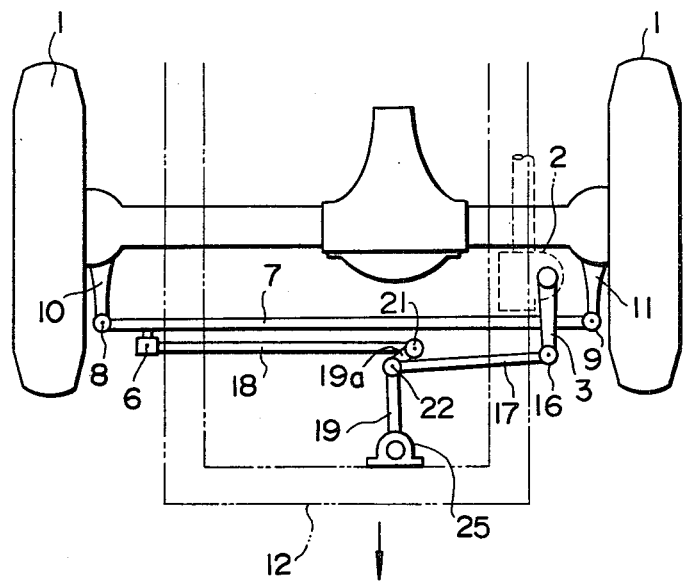
FIG. 3 is a schematic plan view showing a steering linkage according to a first embodiment of the present invention.
Figure 4:
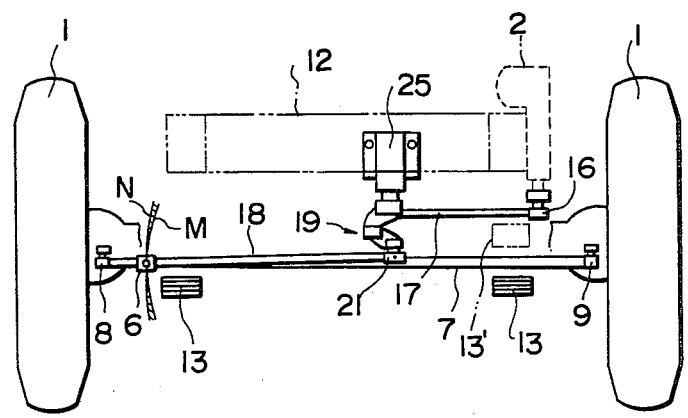
FIG. 4 is a schematic front view of the steering linkage shown in FIG. 3.

FIGS. 3 and 4 show a first embodiment of the present invention. The construction prior art drag link 5 is improved according to the present invention as seen by a comparison of FIGS. 3 and 4 with the prior art steering linkage shown in FIGS. 1 and 2.

The pair of front wheels 1 are secured to the frame 12 at a front portion thereof. The tie rod 7 is laterally arranged between the pair of front wheels 1. The ends of the tie rod 7 are connected to the respective knuckle arms 10, 11 through the knuckle ball joints 8, 9. Those knuckle arms 10, 11 are secured to the respective front wheels 1. The steering gear 2 is connected to one end of the pitman arm 3. Such a construction of the steering linkage is substantially the same as in the prior art.

In a steering linkage according to the first embodiment of the present invention, the other end of the pitman arm 3 is connected through a relay rod ball joint 16 to one end of a relay rod 17. One end of a drag link 18 is connected through the drag link ball joint 6 to the tie rod 7 near one end thereof. A relay lever 19 is movably secured at one end thereof to the vehicle frame 12 and is pivotally connected near its other end thereof to the relay rod 17 and the drag link 18. For example, the relay lever 19 has a connection portion 19a which the relay rod 17 and the drag link 18 are connected. It is preferable that the connecting portion 19a of the relay lever 19 extends vertically, and the other end of the relay rod 17 is connected to an upper portion of the vertically extending connection portion 19a of the relay lever 19 while the other end of the drag link 18 is connected with a lower portion thereof as best shown in FIG. 4. In the illustrated embodiment, the relay lever 19 has a generally L-shape, including a horizontally extending portion and a vertically extending portion contiguous thereto. The bottom of the vertically extending portion of the relay lever 19 is connected through a drag link ball joint 21 to the other end of the drag link 18. The top of the vertically extending portion of the relay lever 19 is connected through a relay rod ball joint 22 to the other end of the relay rod 17. That is, the relay rod ball joint 22 is positioned at a corner where the horizontally extending portion is joined to the vertically extending portion, i.e., the connecting portion 19a. The base portion of the horizontally extending portion of the relay lever 19 is movably secured to a relay lever bracket 25 which is fixed to the vehicle frame 12.

As shown in FIG. 4, the relay rod 17 and the drag link 18 are arranged substantially in parallel with the tie rod 7. In other words, when the vehicle frame 12 is horizontally positioned, the relay rod 17 and the drag link 18 are horizontally placed. As the relay rod 17 is placed at a higher level than the drag link 18, they are distant and connected by the connecting portion 19a of the relay lever 19.

The steering gear 2 is secured to a side portion of the frame 12 as in the prior art.

In another mode of the present invention, although not illustrated, the drag link ball joint 6 may be placed on a portion integrally extending from the knuckle arm 10 so that one end of the drag link 18 is pivotally joined through the drag link ball joint 6 to the tip end of such an extension of the knuckle arm 10.

In the first embodiment of the present invention, the drag link ball joint 21 interposed between the drag link 18 and the lower end of the connecting portion 19a of the relay lever 19 is positioned near to but slightly above the imaginary line between the knuckle ball joints 8, 9. Thus, even if the automotive vehicle runs on a poor or bad road, as shown in FIG. 4, the movement locus N of the drag link ball joint 6 around the drag link ball joint 21 is not greatly different from the movement locus M of the same drag link ball joint 6 around the knuckle ball joint 9 so that a force from the road to the steering wheel which is called "kick back" is decreased.

Figure 1:
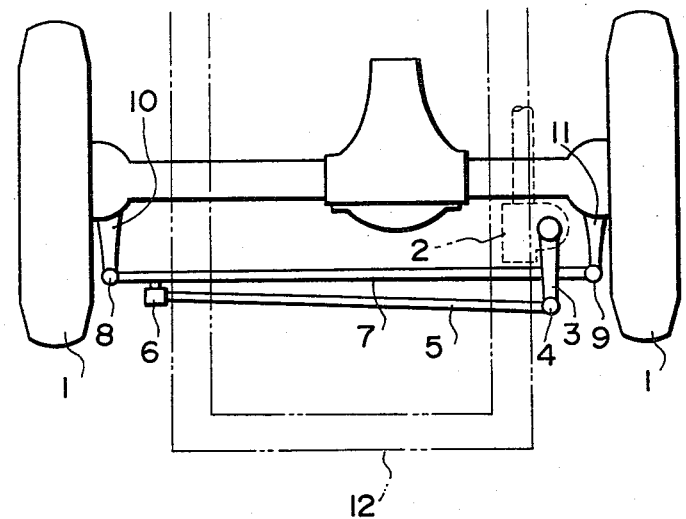
FIG. 1 is a schematic plan view showing a prior art steering linkage.

In an experiment, when the drag link ball joint 21 was set within about 40 mm above or below the imaginary line between both the knuckle ball joints 8 and 9 in a normal driving condition of the vehicle, a circumferential acceleration of the steering wheel was decreased by 50% in comparison with the prior art shown in FIGS. 1 and 2 during driving on a poor road.

In the first embodiment shown and described, the relay rod 17 is horizontally arranged so that the relay rod 17 does not contact the leaf spring 13 at the full bounding thereof as shown by the chain line 13' in FIG. 4. Also, the relay rod 17 can be formed and arranged in other to avoid contact with leaf spring 13.

Figure 5:
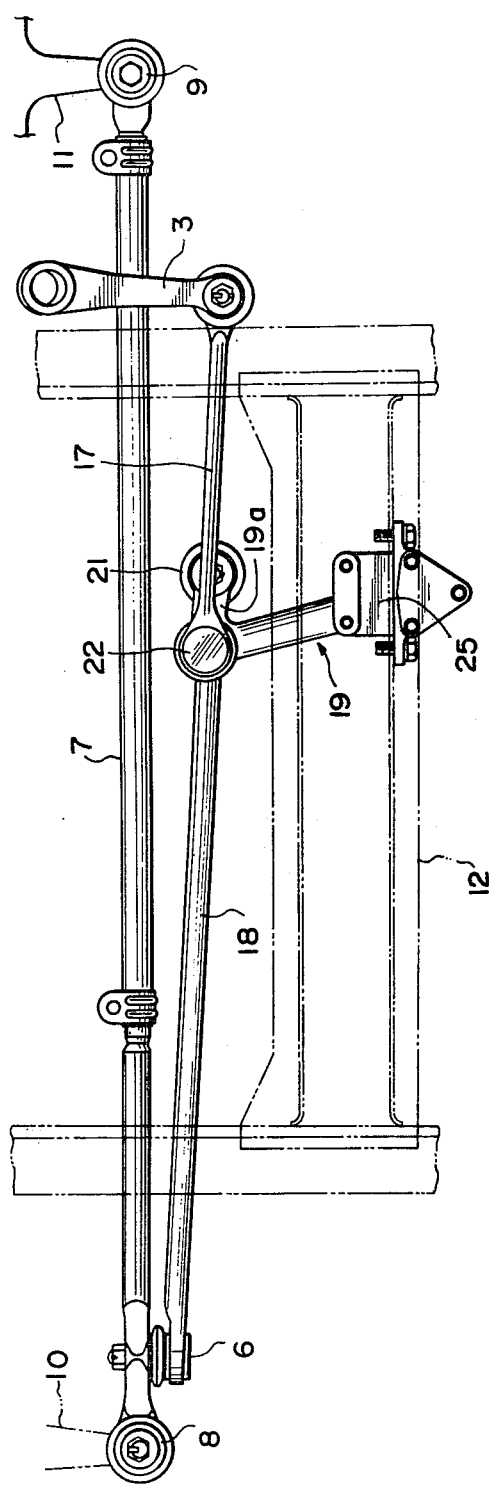
FIG. 5 is a plan view showing a second embodiment of the present invention.
Figure 6:
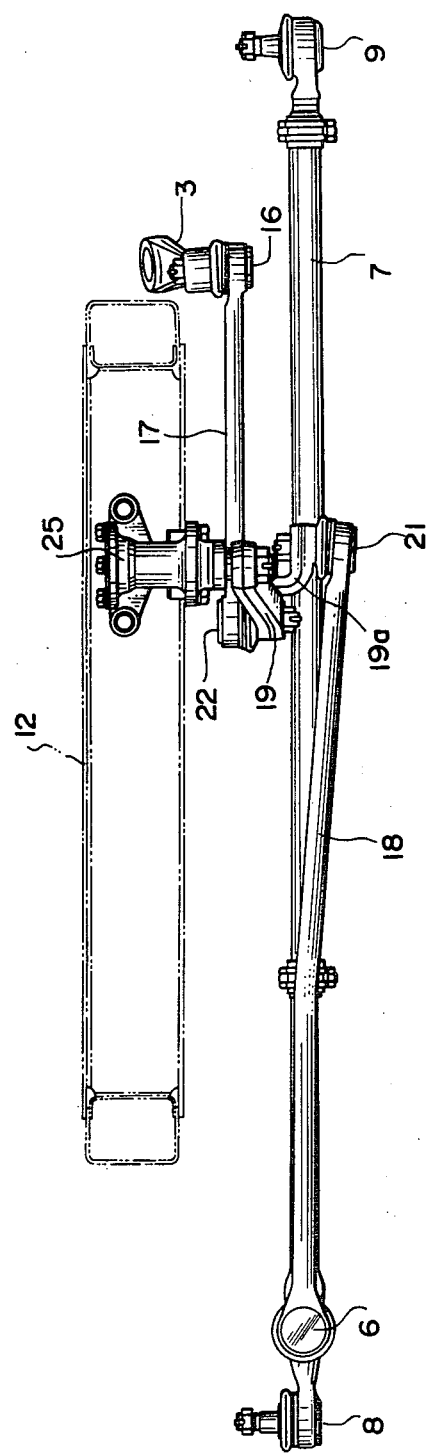
FIG. 6 is a front view of the steering linkage shown in FIG. 5.

FIGS. 5 and 6 show the second embodiment of the present invention in which the drag link ball joint 21 interposed between the drag link 18 and the connecting portion 19a of the relay lever 19 is positioned slightly below the imaginary line between both the knuckle ball joints 8 and 9. Except for this modified construction of the linkage, the second embodiment of the present invention is substantially the same as the first embodiment thereof. Thus, the detailed description of the second embodiment is omitted.

According to the present invention, the drag link ball joint 21 is positioned near the line between both the knuckle ball joints 8 and 9. For example, it is positioned slightly above the line between both the knuckle ball joints in the first embodiment while it is positioned slightly below the line between both the knuckle ball joints in the second embodiments. In order to obtain the best results, the drag link ball joint 21 is preferably positioned within about 40 mm below or above the line between the knuckle ball joints.

According to the present invention, the so called "kick back" phenomenon can be substantially avoided or decreased. As a result, it is possible to omit a kick back damper which has been always provided in a four-wheel drive vehicle in the prior art. In addition, the deforming degree of the leaf spring can be increased. In other words, a more resilient leaf spring can be used so as to improve the driver's comfort during his driving.

What is claimed is:

1. A lateral drag link type steering linkage for an automotive vehicle equipped with a vehicle frame and a pair of front wheels and a pair of rear wheels attached thereto, comprising:
   a pair of knuckle arms fixedly connected at one end thereof to the respective front wheels;
   a pair of knuckle ball joints provided at the other ends of the knuckle arms, respectively;
   a tie rod connected between the other ends of the knuckel arms through the knuckle ball joints;
   a steering gear;
   a pitman arm having one end connected to the steering gear;
   a drag link for operating in response to the movement of the pitman arm so as to actuate the knuckle arms by means of the tie rod;
   a relay lever pivotally mounted at one end thereof to the vehicle frame, the relay lever having a connecting portion;
   a drag link ball joint through which the connecting portion of the relay lever is movably joined to one end of the drag link; and
   a relay rod one end of which is movably connected to the other end of the pitman arm and the other end of which is movably connected to the connecting portion of the relay lever; the drag link ball joint being positioned near the imaginary line between both the knuckle ball joints.

2. A lateral drag link type steering linkage of claim 1, wherein the other end of the drag link is movably joined to the tie rod near one end thereof.

3. A lateral drag link type steering linkage of claim 1, wherein the other end of the drag link is movably joined to one of the knuckle arms.

4. A lateral drag link type steering linkage of claim 1, wherein the drag link is arranged substantially in parallel with the tie rod.

5. A lateral drag link type steering linkage of claim 1, wherein both the drag link and the relay rod are arranged substantially in parallel with the tie rod.

6. A lateral drag link type steering linkage of claims 4 or 5 wherein the relay lever is formed in such a way that a base end portion of a horizontally extending portion of the relay lever is movably secured through a bracket to the vehicle frame, a lower end portion of a vertically extending portion of the relay lever is movably joined to the drag link, and an upper portion of the vertically extending portion of the relay lever is movably joined to the relay rod.

7. A lateral drag link type steering linkage of claim 6, wherein the drag link ball joint is positioned within about 40 mm above or below the imaginary line between both the knuckle ball joints.

8. A lateral drag link type steering linkage of claim 1, wherein the drag link ball joint is positioned within about 40 mm above or below the imaginary line between both the knuckle ball joints.

9. A lateral drag link type steering linkage of claim 1, wherein the connecting portion of the relay lever is positioned near the center line of the vehicle frame.

10. A lateral drag link type steering linkage for an automotive vehicle equipped with a vehicle frame and a pair of front wheels and a pair of rear wheels attached thereto, characterized by a relay lever pivotally mounted at one end thereof to the vehicle frame, the relay lever having a connecting portion, a drag link ball joint through which the connecting portion of the relay lever is movably joined to one end of a drag link, a relay rod one end of which is movably connected to one end of a pitman arm for a steering gear and the other end of which is movably connected to the connecting portion of the relay lever, the drag link ball joint being positioned near the imaginery line between a pair of knuckle ball joints for a pair of knuckle arms, the drag link being arranged substantially in parallel with a tie rod connected between the knuckle arms, and the relay lever being formed in such a way that a base end portion of a horizontally extending portion of the relay lever is movably secured through a bracket to the vehicle frame, a lower end portion of a vertically extending portion of the relay lever being movably joined to the drag link, and an upper portion of the vertically extending portion of the relay lever being movably joined to the relay rod.

11. A lateral drag link type steering linkage of claim 10, wherein both the drag link and the relay rod are arranged substantially in parallel with the tie rod connected between the knuckle arms.

12. A lateral drag link type steering linkage of claim 10, wherein the drag link ball joint is positioned within about 40 mm above or below the imaginary line between both the knuckle ball joints.

13. A lateral drag link type steering linkage for an automotive vehicle equipped with a vehicle frame and a pair of front wheels and a pair of rear wheels attached thereto, characterized by a relay lever pivotally mounted at one end thereof to the vehicle frame, the relay lever having a connecting portion, a drag link ball joint through which the connecting portion of the relay lever is movably joined to one end of a drag link, a relay rod one end of which is movably connected to one end of a pitman arm for a steering gear and the other end of which is movably connected to the connecting portion of the relay lever, the drag link ball joint being positioned near the imaginary line between a pair of knuckle ball joints for a pair of knuckle arms, wherein the drag link ball joint is positioned within about 40 mm above or below the imaginary line between both the knuckle ball joints.

* * * * *